Dec. 29, 1953 N. W. PARKER 2,664,463

SYNCHRONIZATION SYSTEM

Filed Aug. 18, 1951 3 Sheets-Sheet 1

INVENTOR.
Norman W. Parker
BY
Norman L. Mueller
Atty

Dec. 29, 1953 N. W. PARKER 2,664,463

SYNCHRONIZATION SYSTEM

Filed Aug. 18, 1951 3 Sheets-Sheet 2

INVENTOR.
Norman W. Parker
BY
Foorman L. Mueller
Atty.

Dec. 29, 1953 | N. W. PARKER | 2,664,463

SYNCHRONIZATION SYSTEM

Filed Aug. 18, 1951 | 3 Sheets-Sheet 3

INVENTOR.
Norman W. Parker
BY
Foorman L. Mueller
Atty.

Patented Dec. 29, 1953

2,664,463

UNITED STATES PATENT OFFICE 2,664,463

SYNCHRONIZATION SYSTEM

Norman W. Parker, Park Forest, Ill., assignor to Motorola, Inc., Chicago, Ill., a corporation of Illinois Application August 18, 1951, Serial No. 242,549

14 Claims. (Cl. 178—5.4)

This invention relates generally to color television systems, and more particularly to a system for separating color synchronization pulses from the complete color television signal.

For reproducing color television, an element of synchronization is necessary in addition to the field and line synchronization which is required for black and white television. Color synchronization may be provided in a sequential color system by the inclusion of a pulse in the composite signal preceding the pulse for synchronizing fields of one color. In order to provide a pulse which does not disturb the normal field and line synchronization, the pulse must be positioned carefully with respect to the other synchronization pulses and this results in considerable difficulty in deriving the color synchronization pulse. In a proposed system the color pulse is positioned between the first and second equalizer pulses which precede the field pulse for the red color field.

The color control pulse after separation from the complete synchronization signal is used to synchronize some color separating means such as the mechanically moving color filter or other means which causes individual colors to be produced in sequence.

It is therefore an object of the present invention to provide a simple circuit for deriving the color synchronization pulse from a composite color television signal.

A further object of this invention is to provide a system for producing a large amplitude control pulse synchronized with the color pulse of a combined synchronization signal, and which is highly selective with respect to other pulses of the signal or noise.

A feature of this invention is the provision of means for producing a pedestal pulse wave with which the synchronization signal is combined so that the color pulse is superimposed on a pedestal to have greater amplitude than other pulses of the synchronization signal.

A further feature of this invention is the provision of a pedestal wave for use in separating color synchronizing pulses, in which the individual pedestals have leading edges coinciding with the leading edges of the horizontal pulses but being of such shape that the horizontal pulses are not substantially elevated thereby. The pedestals are of such duration that they coincide with the color pulse but do not extend to the interspersed equalizer pulses.

A still further feature of this invention is the provision of a multivibrator synchronized with horizontal pulses for producing a pedestal pulse wave, with means for shaping the pedestals to have a slow rise and means for combining the synchronization signals therewith so that only the color pulse is superimposed on a pedestal. A control pulse wave is provided by an amplifier which is normally biassed off, and is rendered conducting by the superimposed color pulse to provide a high amplitude relatively wide color control pulse.

Further objects and features, and the attending advantages of the invention will be apparent from a consideration of the following description when taken in connection with the accompanying drawings, in which.

In practicing the invention there is provided a system for receiving, selecting and amplifying the video signal including picture and synchronizing components, and the sound signal. The sound signal is reproduced in a loud speaker, the picture components are reproduced by a cathode ray tube or the like, and the synchronizing components control the movement of the beam of the tube and also the color reproduced thereby. A system is provided for producing a control pulse which is synchronized with a color pulse interspersed between the first and second equalizer pulses of the red color field. This control pulse controls color selecting means such as a disk having sections forming filters for transmitting various colors, and which is rotated to sequently display the various colors. The color pulse is separated by providing a pedestal wave which is of such shape, and is so phased with respect to the synchronization signal that only the color pulse is superimposed on a pedestal. Therefore the color pulse has a higher amplitude than the other pulses of the synchronizing signal and is used to trigger means for producing a control pulse. In a mechanical system as illustrated, the control pulse may operate through a motor control circuit to control the phase of the color filter disk with respect to the picture elements being reproduced on the cathode ray tube viewed through the disk.

Figure 1:
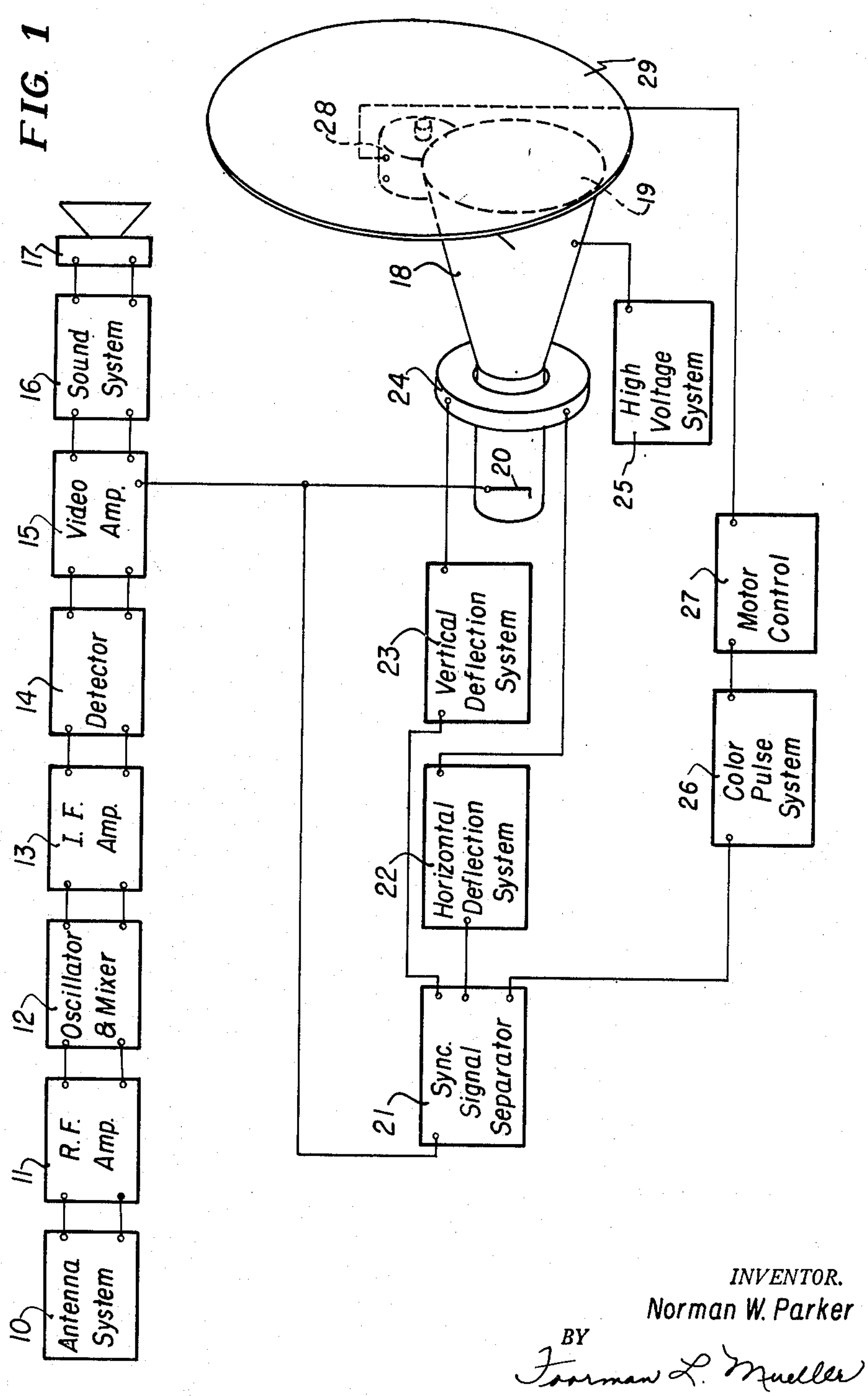
Figure 1 is a block diagram illustrating a sequential color television system with which the invention may be practiced.

Referring now to the drawings, in Figure 1 there is illustrated a color television receiver including an antenna system 10 for receiving and selecting composite video signals and sound signals. Provided in the order stated are a radio frequency amplifier 11, oscillator and mixer 12, intermediate frequency amplifier 13, detector 14 and video amplifier 15. The sound signals are selected from the combined signal and detected in a sound system 16 and applied to a loud speaker 17 wherein they are reproduced.

The video signal is applied to an electrode 20 of the cathode ray tube 18 for modulating the intensity of the beam thereof. The video signal is also applied to the synchronization signal separator 21 in which the synchronization pulses are separated from the composite video signal including the picture elements. The synchronization signal is applied to horizontal deflection system 22 and vertical deflection system 23 to control deflection means 24 which may be either of the electrostatic or electromagnetic type as may be desired in a particular application. A high voltage system 25 is also provided for the cathode ray tube 18 and may be of any standard type.

The complete synchronization signal is applied to the color pulse deriving system 26 with the color control pulse provided thereby being applied to motor control circuit 27 which controls the phase of the motor 28. The motor 28 drives a disk 29 which may include portions which operate as filters to select various colors, so that the signal reproduced on the screen 19 of the cathode ray tube 18 appears as various colors depending upon the position of the disk 29 with respect thereto. It is apparent that in order for the colors to be reproduced properly, the position of the disk 29 must be carefully phased with respect to the picture elements displayed on the screen 19.

Figure 2:
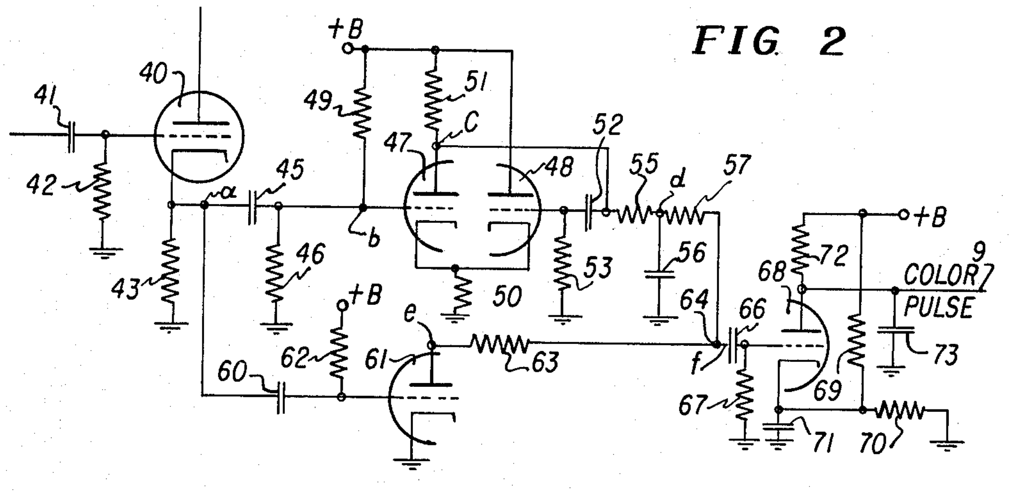
Figure 2 is a circuit diagram of the color pulse deriving system.
Figure 3:
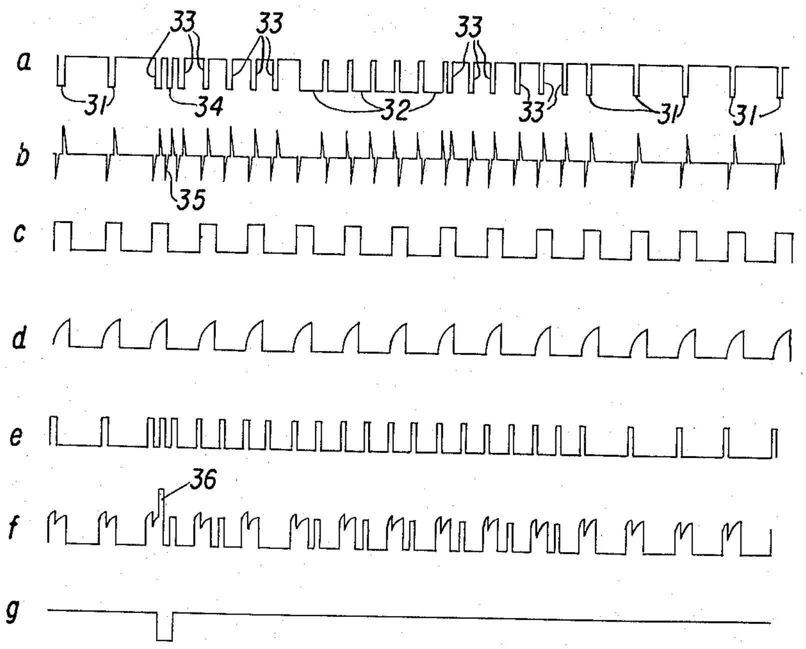
Figure 3 is a plurality of curves illustrating the operation of the circuit of Figure 2.

Considering now the color pulse deriving system in accordance with the invention, reference is made to Figure 2 showing the circuit of the system and Figure 3 which includes curves illustrating the operation thereof. In Figure 3, curve *a* illustrates a synchronization pulse wave of negative polarity. The pulses for controlling each line in the reproduced picture, generally referred to as horizontal synchronization pulses, are indicated at 31, the field or vertical synchronization pulses are indicated at 32, the equalizer pulses are shown at 33 and the color pulse is shown at 34. The signal shown is a standard video signal in which the vertical pulse has a duration of three lines and is serrated to form in effect six separate pulses. Six equalizing pulses having twice line frequency are provided before and after the vertical pulse and cooperate with the serrated vertical pulse so that horizontal synchronization is not substantially disturbed thereby. The color pulse 34 is spaced between the first and second equalizer pulses of one field which may be considered the red field for purposes of illustration.

The synchronizing pulse wave *a* is produced by the synchronizing signal separator 21 of Figure 1, the last stage of which is shown in Figure 2 and is designated 40. The stage 40 is a cathode follower stage with the synchronizing signal being applied through condenser 41 and across resistor 42 to the grid thereof and the synchronizing pulse wave, from which the color control pulse is derived, being obtained from the cathode resistor 43. The plate of the tube may be connected to the horizontal and vertical deflection systems for synchronizing the same.

The synchronizing pulse wave appearing across resistor 43 is that shown by curve *a* in Figure 3, and is applied through the differentiation circuit including condenser 45 and resistor 46 which serve to provide the wave illustrated by curve *b*. It is noted that by such differentiation the energy in the vertical pulse is removed, and the negative portion of the wave includes horizontal pulses interspersed by double frequency pulses during the equalizing and vertical portions of the synchronizing signal. The color synchronization pulse also provides a negative pulse as indicated at 35.

The pulse wave *b* is applied to a multivibrator formed by the triode sections 47 and 48 which may be included in a single envelope. The grid of the triode 47, to which the pulse wave *b* is applied, is biassed with respect to plus B through resistor 49. The cathodes of the two triode sections are connected together and grounded through resistor 50. The plate of triode section 47 is connected to plus B through resistor 51 and coupled to the grid of triode section 48 through condenser 52 and across resistor 53. The plate of triode 48 is connected directly to plus B. The multivibrator is adjusted to provide a square wave, the leading edge of which is in phase with the leading edge of the horizontal pulses, and the duration of which is somewhat less than half the interval between the horizontal pulses. The output from the multivibrator is applied to the shaping network including resistor 55, condenser 56, and resistor 57, which operates to slow down the rise of the leading edge of the pulses of the wave to provide a wave as illustrated by curve *d*. The reason for this shaping of the wave will be apparent from the following description.

The synchronizing pulse wave *a* from the cathode resistor 43 is also applied through a second channel, being applied through coupling condensers 60 to the grid of triode 61. This grid is returned to plus B by resistor 62 which provides continuous grid current flow. The grid current through triode 61 provides a low resistance path, which together with condenser 60, differentiates the negative half of the signals and clips the positive half. Since the differentiated negative pulses are greater than the cutoff value of triode 61, the bright signal of the triode is a series of square top pulses of short duration that are initiated by the negative going edges of the synchronization signal (curve *a*, Figure 3). The provision of short pulses is necessary to avoid interference from the vertical synchronization signal. The inverted signal at the plate of tube 61 is applied through resistor 63 to the point 64 where this pulse wave is combined with the pedestal pulse wave produced by the multivibrator. The inverted and modified pulse wave is illustrated by curve *e* of Figure 3.

The resistor 57 and 63 form a mixing network for combining the inverted synchronization pulses with the pedestal pulses to provide a combined pulse wave as illustrated by curve *f* in Figure 3. It is noted that because of the slow rise of the pedestal pulses, the horizontal pulses occur when the pedestal wave is of low amplitude and therefore the composite wave does not substantially increase the amplitude of the horizontal pulses. The pedestal, however, rises to a substantial level when the color pulse appears, to increase the amplitude thereof as illustrated at 36 in curve *f*. The pedestal drops immediately after the color pulse occurs so that the second equalizer pulse which follows the color pulse will not be increased in amplitude by the pedestal.

To meet these conditions it is apparent that the pedestal must have a duration less than half the interval between horizontal pulses and must have an interval slightly greater than one-fourth the interval. To provide optimum results, the duration of the pedestal should be of the order of 30 to 35% of the interval between horizontal pulses and should not reach its maximum amplitude until just at the end thereof. This not only prevents the superpositioning of other synchronization pulses on the pedestals, but also is effective to reduce the possibility of improper triggering of the system by noise pulses which may be present.

The combined wave as shown in curve *f* is applied through condenser 66 and across resistor 67 to the grid of triode section 68 which serves as a class C amplifier which is normally cut off. The bias for cutting off the amplifier is provided by the voltage divider including resistors 69 and 70 connected between plus B and ground. The cathode is by-passed by condenser 71. The values of 69 and 70 are adjusted with respect to the pulse wave applied thereto so that the tube 68 will not conduct on the synchronization pulses themselves or the pedestal pulses themselves but will conduct only when a synchronizing pulse is superimposed on a pedestal pulse. The plate of the triode 68 is connected to plus B through resistor 72, and condenser 73 is bridged across the tube and serves to widen the output color control pulse so that it may be used more effectively to control the color selecting means of the receiver. By using an amplifier of the type illustrated, control pulses of large amplitude may be produced and the duration may be controlled to provide a solid control pulse.

Figure 4:
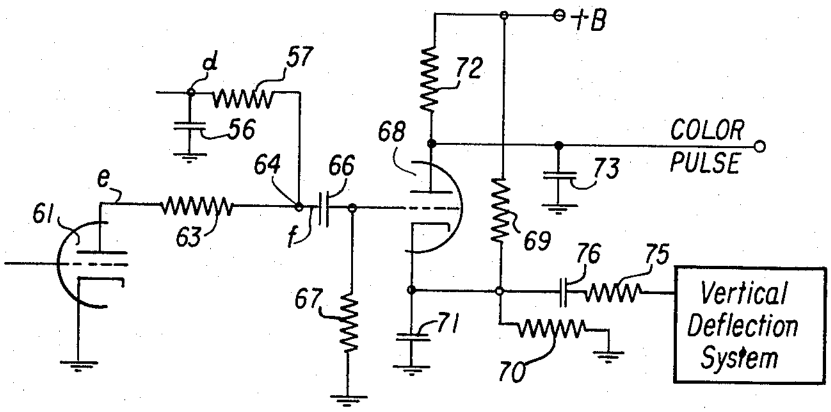
Figure 4 is a circuit diagram having a second embodiment of the invention.

Although the system described is quite effective in separating the color synchronization pulse from the composite synchronization signal, the system may be improperly triggered by noise pulses following the horizontal pulses by one-fourth the time interval between horizontal pulses, which is the position of the color pulses. The immunity of the system to such noise pulses can be increased materially by increasing the bias on the triode 68 during the period between vertical pulses. In Figure 4 there is illustrated a relatively simple circuit for accomplishing this result.

Figure 5:
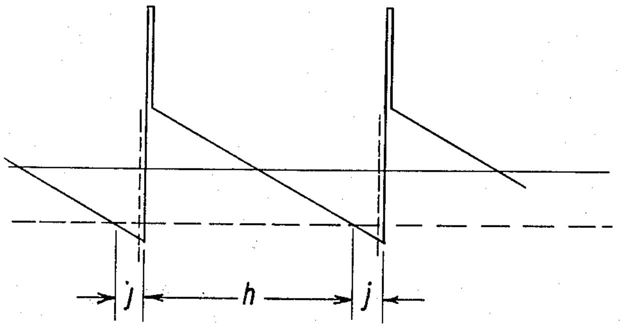
Figure 5 is a curve illustrating the operation of the circuit of Figure 4.

The circuit of Figure 4 is identical to the circuit of Figure 2 except that a connection is made to the cathode of triode 68 from the vertical deflection system. As is well known, a voltage wave may be derived from the vertical deflection system which includes a large positive going pulse together with a negative going sawtooth wave. This wave is illustrated in Figure 5. A voltage can be derived from this wave for increasing the bias on the triode 68 during the interval between vertical synchronization pulses. This circuit includes resistor 75 and condenser 76 connected in series to the cathode of triode 68 for modifying the bias voltage appearing across the condenser 71. This increases the bias during the portion of the wave indicated at *h* but allows the bias to fall during the region *j* so that the triode 68 is sensitive during this region. As the color synchronization pulses always appear just ahead of the vertical pulses, the sensitive region permits the color pulses to pass to the triode 68 to provide the control pulse.

It is seen from the above, that a relatively simple system has been provided for separating the color synchronization pulses from the complete synchronizing signal and for providing a color control pulse which may be used for synchronizing the color selecting device of the receiver. The multivibrator providing the pedestals is accurately synchronized by the differentiated synchronizing signals and may be adjusted to provide a pedestal pulse wave in which the pedestals have the desired duration. This wave is modified so that the leading edges of the pedestals rise slowly, and therefore the wave may be phased so that the leading edges of the pedestals are in phase with the leading edges of the horizontal synchronizing pulses. By providing this slow rise it is not necessary to delay the pedestal with respect to the horizontal pulses, which results in a simplification of the circuit.

The synchronizing pulse wave is inverted and modified somewhat before being combined with the pedestal wave so that the only synchronizing pulse which is of such phase to be combined with a pedestal is the color synchronizing pulse. This permits amplitude selection of the color pulse by use of a biased off amplifier which is keyed into conduction only when a pulse greater than a predetermined amplitude is applied thereto. Such an amplifier may be accurately adjusted so that the synchronizing pulses in themselves or the pedestals alone will not render it conducting, and it will be rendered conducting only when a pulse of a greater amplitude is applied. The output from the amplifier may be very large and may be widened in the manner previously described. By controlling the bias of the amplifier so that it is greater between vertical synchronization pulses, noise immunity between color pulses is provided.

Although certain embodiments of the invention have been disclosed which are illustrative thereof, it is obvious that various changes and modifications can be made therein without departing from the intended scope of the invention as defined in the appended claims.

I claim:

1. In a synchronization system which operates from a signal including a first pulse wave having a relatively high repetition rate, a second pulse wave having a relatively low repetition rate, and which may include a control pulse immediately following a pulse of said first wave in the region immediately preceding said pulses of said second wave; a circuit for deriving said control pulse from said signal including in combination, means synchronized by said first pulse wave for producing a pedestal pulse wave occurring at the frequency of said first pulse wave, with the individual pedestal pulses having a duration less than the interval between pulses of said first pulse wave, and with the leading edges of the pedestal pulses being in phase with the leading edges of the pulses of said first wave and having a relatively slow rate of rise, means for combining said signal with said pedestal wave so that said control pulses are superimposed on said pedestal pulses and the remaining pulses of said signal fall between said pedestals, amplitude responsive means for providing an output signal from said superimposed control and pedestal pulses, said amplitude responsive means including bias controlling means controlled by said second pulse wave for increasing the bias on said amplitude responsive means during the period following each pulse of said second pulse wave and just preceding the next pulse of said second pulse wave, so that said amplitude responsive means does not produce an output signal during said period.

2. In a color television system which is synchronized by signal including vertical pulses occurring at each field and horizontal pulses occurring at each line, and with a color pulse being provided at certain fields immediately following a horizontal pulse and in the region adjacent said vertical pulses; a circuit for separating said color pulse from said synchronizing signal including in combination, means synchronized by said horizontal pulses for producing a pedestal pulse wave at the frequency of said horizontal pulses, with the individual pedestal pulses having a duration less than half the interval between said horizontal pulses and with the leading edges thereof being in phase with the leading edges of said horizontal pulses and having a relatively slow rate of rise, means for combining said synchronizing signal with said pedestal pulse wave so that said color pulses are superimposed on pedestals and the remaining pulses of said synchronization signal occur when the amplitude of said pedestal pulse wave is low, amplifier means including an electron discharge valve having at least a cathode, an anode and a control grid, biasing means coupled to said cathode providing a relatively large bias for holding said valve cutoff at periods adjacent said vertical synchronization pulses and providing a bias greater than the amplitude of the individual pulses of said synchronization signal and said pedestal pulse wave at periods intermediate said vertical synchronization pulses, means for applying the combined synchronizing signal and pedestal pulse wave to said grid of said valve to overcome said bias and render said valve conducting in response to the superimposed color pulse and pedestal pulse, and output circuit means connected to said anode of said valve.

3. In a color television system which is synchronized by a signal including, vertical pulses occurring at each field and horizontal pulses occurring at each line, with equalizer pulses at twice line frequency being provided before and after each vertical pulse and a color pulse being provided between the first and second equalizer pulses of predetermined fields, a circuit for deriving said color pulses from said synchronization signal including in combination, means for differentiating said signal, a multivibrator synchronized by the differentiated signal for producing a pedestal pulse wave occurring at the frequency of said horizontal pulses, with the individual pedestal pulses having a duration somewhat less than half the interval therebetween and the leading edges thereof being in phase with the leading edges of said horizontal pulses, wave shaping means for modifying said pedestal pulse wave so that the slope of the leading edges thereof is reduced, means for combining said synchronization signal with modified said pedestal pulse wave so that said color pulses are superimposed on pedestal pulses and the remaining pulses of said synchronization signal fall between said pedestal pulses, and amplitude responsive means for providing a control pulse from said superimposed color and pedestal pulses.

4. In a color television system in which fields of various colors are separately shown and which is synchronized by a signal including, vertical pulses occurring at each field and horizontal pulses occurring at each line, with equalizer pulses at twice line frequency being provided before and after each vertical pulse, and a color pulse being provided between the first and second equalizer pulses of fields of one color; a circuit for deriving said color pulses from said synchronization signal including in combination, multivibrator means synchronized by said signal for producing a pedestal pulse wave occurring at the frequency of said horizontal pulses, with the individual pedestal pulses having a relatively slow rate of rise and a duration somewhat less than half the interval therebetween, and the leading edges thereof being in phase with the leading edges of said horizontal pulses, means for combining said synchronization signal with said pedestal pulse wave so that said color pulses are superimposed on pedestal pulses and the remaining pulses of said synchronization signal occur when the amplitude of said modified pedestal pulse wave is low, and means for providing a control signal from said superimposed pedestal and color pulses.

5. In a color television system in which fields of various colors are separately shown and which is synchronized by a signal including, vertical pulses occurring at each field and horizontal pulses occurring at each line, with equalizer pulses at twice line frequency being provided before and after each vertical pulse, and a color pulse being provided between the first and second equalizer pulses of fields of one color; a system for controlling color selecting means by said synchronization signal including in combination, means synchronized by said signal for producing a pedestal pulse wave occurring at the frequency of said horizontal pulses, with the individual pedestal pulses having a relatively slow rate of rise and a duration somewhat less than half the interval therebetween and the leading edges thereof being in phase with the leading edges of said horizontal pulses, means for combining said synchronization signal with said pedestal pulse wave so that said color pulses are superimposed on pedestal pulses and the remaining pulses of said synchronization signal occur when the amplitude of said modified pedestal pulse wave is low, means for providing a control signal from said superimposed pedestal and color pulses, and color selecting means controlled by said control signal.

6. In a color television system in which fields of various colors are shown sequentially and which is synchronized by a signal including, vertical pulses occurring at each field and horizontal pulses occurring at each line, with equalizer pulses at twice line frequency being provided before and after each vertical pulse, and a color pulse being provided between the first and second equalizer pulses of fields of one color; a circuit for deriving said color pulses from said synchronization signal including in combination, means for differentiating said signal, means synchronized by the differentiated signal for producing a pedestal pulse wave occurring at the frequency of said horizontal pulses, with the individual pedestal pulses being square waves having a duration somewhat less than half the interval therebetween and the leading edges thereof being in phase with the leading edges of said horizontal pulses, means for modifying said pedestal pulse wave so that the rate of rise of the pedestal pulses thereof is relatively slow, means for combining said synchronization signal with said modified pedestal pulse wave so that said color pulses are superimposed on pedestals and the remaining pulses of said synchronization signal occur when the amplitude of said modified pedestal pulse wave is low, and means for providing a control signal from said superimposed pedestal color pulses.

7. In a color television system in which fields of various colors are shown sequentially and which is synchronized by a signal including, vertical pulses occurring at each field and horizontal pulses occurring at each line, with equalizer pulses at twice line frequency being provided before and after each vertical pulse, and a color pulse being provided between the first and second equalizer pulses of fields of one color; a system for controlling color selecting means by said synchronization signal including in combination, means for differentiating said signal, multivibrator means synchronized by the differentiated signal for producing a pedestal pulse wave occurring at the frequency of said horizontal pulses, with the individual pedestal pulses being square waves having a duration somewhat less than half the interval therebetween and the leading edges thereof being in phase with the leading edges of said horizontal pulses, means for modifying said pedestal pulse wave so that the slope of the leading edges of the pulses thereof is reduced, means for combining said synchronization signal with said modified pedestal pulse wave so that said color pulses are superimposed on pedestals and the remaining pulses of said synchronization signal occur when the amplitude of said modified pedestal pulse wave is low, means for providing a control signal from said superimposed pedestal color pulses, and color selecting means controlled by said control signal.

8. In a color television system in which fields of various colors are shown sequentially and which is synchronized by a signal including, vertical pulses occurring at each field and horizontal pulses occurring at each line, with equalizer pulses at twice line frequency being provided before and after each vertical pulse, and a color pulse being provided between the first and second equalizer pulses of fields of one color; a circuit for deriving said color pulses from said synchronization signal including in combination, means for differentiating said signal, means synchronized by the differentiated signal for producing a pedestal pulse wave occurring at the frequency of said horizontal pulses, with the individual pedestal pulses being square waves having a duration somewhat less than half the interval therebetween and the leading edges thereof being in phase with the leading edges of said horizontal pulses, means for modifying said pedestal pulse wave so that the rate of rise of each pedestal pulse thereof is relatively slow, means for combining said synchronization signal with said modified pedestal pulse wave with said color pulses being superimposed on pedestal pulses and the remaining pulses of said synchronization signal occurring when the amplitude of said modified pedestal pulse wave is low so that said color pulses are raised above a predetermined voltage and the remaining pulses in said synchronization signal remain below said predetermined voltage, amplifier means normally biassed to be non-conducting and rendered conducting by a voltage greater than said predetermined voltage, and means for applying the combined synchronization signal and pedestal pulse wave to said amplifier means to render the same conducting when said color pulse appears to provide a control signal.

9. In a color television system in which fields of various colors are shown sequentially and which is synchronized by a signal including, vertical pulses occurring at each field and horizontal pulses occurring at each line, with equalizer pulses at twice line frequency being provided before and after each vertical pulse, and a color pulse being provided between the first and second equalizer pulses of fields of one color; a circuit for deriving said color pulses from said synchronization signal including in combination, means for differentiating said signal, multivibrator means synchronized by the differentiated signal for producing a pedestal pulse wave at the frequency of said horizontal pulses, with the individual pedestal pulses being square waves having a duration somewhat less than half the interval therebetween and the leading edges thereof being in phase with the leading edges of said horizontal pulses, a wave shaping circuit for modifying said pedestal pulse wave so that the slope of the leading edge of each pedestal pulse thereof is substantially reduced, means for combining said synchronization signal with said modified pedestal pulse wave, with said color pulses being superimposed on pedestal pulses and the remaining pulses of said synchronization signal occurring when the amplitude of said modified pedestal pulse wave is low so that said color pulses are raised above a predetermined voltage and the remaining pulses in said synchronization signal remain below said predetermined value, amplifier means including a triode valve normally biassed beyond cut off and rendered conducting by a voltage wave greater than said predetermined value, and means for applying the combined synchronization signal and pedestal pulse wave to said amplifier to render said amplifier conducting when said color pulse appears to provide a control signal, said amplifier means including capacitor means bridged across said valve for extending the duration of said control signal.

10. In a color television system in which fields of various colors are shown and which is synchronized by a signal including, vertical pulses occurring at each field and horizontal pulses occurring at each line, with equalizer pulses at twice line frequency being provided before and after each vertical pulse and a color pulse being provided between the first and second equalizer pulses of fields of one color; a circuit for deriving said color pulses from said synchronization signal including in combination, means synchronized by said signal for producing a pedestal pulse wave occurring at the frequency of said horizontal pulses, with the individual pedestal pulses having a relatively slow rate of rise and a duration somewhat less than half the interval therebetween and the leading edges thereof being in phase with the leading edges of said horizontal pulses, means for inverting said synchronization signal and for reducing the duration of said vertical pulses, and means for combining said inverted synchronization signal with said pedestal pulse wave so that said color pulses are superimposed on pedestal pulses and the remaining pulses of said synchronization signal occur when the amplitude of said modified pedestal pulse wave is low, and means for providing a control signal from said superimposed pedestal and color pulses.

11. In a color television system which is synchronized by a signal including vertical pulses occurring at each field and horizontal pulses occurring at each line, with equalizer pulses at twice line frequency being provided before and after each vertical pulse, and a color pulse being provided between the first and second equalizer pulses of predetermined fields. a circuit for deriving said color pulses from said synchronization signal including in combination, means synchronized by the said synchronization signal for producing a pedestal pulse wave occurring at the frequency of said horizontal pulses, with the individual pedestal pulses having a duration somewhat less than half the interval therebetween and the leading edges thereof being in phase with the leading edges of said horizontal pulses and having a relatively slow rate of rise, means for combining said synchronization signal with said pedestal pulse wave so that said color pulses are superimposed on pedestal pulses and the remaining pulses of said synchronization signal fall between said pedestal pulses, and amplitude responsive means for providing a control pulse from said superimposed color and pedestal pulses, said amplitude responsive means including bias controlling means therefor so that the level at which said means is responsive is increased during the period following each vertical pulse and just preceding the next vertical pulse.

12. In a color television system which is synchronized by a signal including vertical pulses occurring at each field and horizontal pulses occurring at each line, with equalizer pulses at twice line frequency being provided before and after each vertical pulse, and a color pulse being provided between the first and second equalizer pulses of predetermined fields, a circuit for deriving said color pulses from said synchronization signal including in combination, a vertical deflection system synchronized by said synchronization signal, means synchronized by the said synchronization signal for producing a pedestal pulse wave occurring at the frequency of said horizontal pulses, with the individual pedestal pulses having a duration somewhat less than half the interval therebetween and the leading edges thereof being in phase with the leading edges of said horizontal pulses and having a relatively slow rate of rise, means for combining said synchronization signal with said pedestal pulse wave so that said color pulses are superimposed on pedestal pulses and the remaining pulses of said synchronization signal fall between said pedestal pulses, and amplitude responsive means for providing a control pulse from said superimposed color and pedestal pulses, said amplitude responsive means including bias controlling means coupled to said vertical deflection system for increasing the bias on said amplitude responsive means during the period following each vertical pulse and just preceding the next vertical pulse, so that said means does not respond to noise pulses during said period.

13. In a color television system in which fields of various colors are shown sequentially and which is synchronized by a signal including vertical pulses occurring at each field and horizontal pulses occurring at each line, with equalizer pulses at twice line frequency being provided before and after each vertical pulse, and a color pulse being provided between the first and second equalizer pulses of fields of one color; a circuit for deriving said color pulses from said synchronization signal including in combination, means for differentiating said signal, means synchronized by the differentiated signal for producing a pedestal pulse wave occurring at the frequency of said horizontal pulses, with the individual pedestal pulses being square waves having a duration somewhat less than half the interval therebetween and the leading edges thereof being in phase with the leading edges of said horizontal pulses, means for modifying said pedestal pulse wave so that the rate of rise of each pedestal pulse thereof is relatively slow, means for combining said synchronization signal with said modified pedestal pulse wave so that said color pulses are superimposed on pedestals and the remaining pulses of said synchronization signal occur when the amplitude of said modified pedestal pulse wave is low, whereby said color pulses are raised above a predetermined voltage and the remaining pulses in said synchronization signal remain below said predetermined value, amplifier means including biasing means therefor, said biasing means providing a relatively large bias for holding said amplifier cut off for a period following each vertical synchronization pulse and just preceding the next vertical synchronization pulse, and a lesser bias for the period preceding said vertical synchronization pulses which has a value such that a voltage greater than said predetermined value renders said amplifier conducting, and means for applying the combined synchronization signal and pedestal pulse wave to said amplifier to render said amplifier conducting when said color pulse appears to thereby provide a control signal.

14. In a color television system in which fields of various colors are shown sequentially and which is synchronized by a signal including vertical pulses occurring at each field and horizontal pulses occurring at each line, with equalizer pulses at twice line frequency being provided before and after each vertical pulse, and a color pulse being provided between the first and second equalizer pulses of fields of one color; a circuit for deriving said color pulses from said synchronization signal including in combination, means for differentiating said signal, means synchronized by the differentiated signal for producing a pedestal pulse wave occurring at the frequency of said horizontal pulses, with the individual pedestal pulses being square waves having a duration somewhat less than half the interval therebetween and the leading edges thereof being in phase with the leading edges of said horizontal pulses, means for modifying said pedestal pulse wave so that the rate of rise of each pedestal pulse thereof is relatively slow, means for combining said synchronization signal with said modified pedestal pulse wave so that said color pulses are superimposed on pedestals and the remaining pulses of said synchronization signal occur when the amplitude of said modified pedestal pulse wave is low, whereby said color pulses are raised above a predetermined voltage and the remaining pulses in said synchronization signal remain below said predetermined value, amplifier means including a valve and biasing means therefor, said biasing means providing a relatively large bias for holding said valve cut off for a period following each vertical synchronization pulse and just preceding the next vertical synchronization pulse, and providing a bias for the period preceding said vertical synchronization pulses having a value substantially equal to said predetermined value; and means for applying the combined synchronization signal and pedestal pulse wave to said amplifier to render said valve conducting when said color pulse appears to provide a control signal.

NORMAN W. PARKER.

References Cited in the file of this patent

UNITED STATES PATENTS

| Number | Name | Date |
|---|---|---|
| 2,502,195 | Wood | Mar. 28, 1950 |
| 2,509,730 | Dome | May 20, 1950 |
| 2,546,972 | Chatterjea | Apr. 3, 1951 |